US005927320A

United States Patent [19]
Pfarr et al.

[11] Patent Number: 5,927,320
[45] Date of Patent: Jul. 27, 1999

[54] HIGH-SPEED WATER JET BLOCKER

[75] Inventors: Craig E. Pfarr, Issaquah; Norman A. Rudy, Snohomish; Darren P. Wattles, Renton, all of Wash.

[73] Assignee: Design Systems Inc., Redmond, Wash.

[21] Appl. No.: 08/824,885

[22] Filed: Mar. 18, 1997

Related U.S. Application Data

[63] Continuation-in-part of application No. 08/618,319, Mar. 19, 1996.

[51] Int. Cl.$^6$ .................. F16K 49/00

[52] U.S. Cl. .................. 137/338; 137/806; 137/831

[58] Field of Search .................. 137/829, 831, 137/806, 338

[56] References Cited

U.S. PATENT DOCUMENTS

| | | | |
|---|---|---|---|
| 1,831,791 | 11/1931 | Mihalyi . | |
| 2,408,603 | 10/1946 | Braithwaite et al. | 137/829 |
| 3,543,798 | 12/1970 | Briguglio | 137/829 |
| 3,678,746 | 7/1972 | Corey | 137/829 |
| 3,934,603 | 1/1976 | Avery | 137/829 |
| 4,603,835 | 8/1986 | deMey, II . | |
| 4,693,153 | 9/1987 | Wainwright et al. . | |
| 4,920,841 | 5/1990 | Johnson . | |

FOREIGN PATENT DOCUMENTS

| | | |
|---|---|---|
| 0 280 861 A1 | 1/1988 | European Pat. Off. . |
| 451 163 | 9/1987 | Sweden . |
| WO 93/10950 | 6/1993 | WIPO . |

*Primary Examiner*—A. Michael Chambers
*Attorney, Agent, or Firm*—Christensen O'Connor Johnson & Kindness PLLC

[57] ABSTRACT

An apparatus and method for performing high speed interruption of the flow of a very fine, high pressure, high speed water jet 12 of the type used to cut foods, paper, and other goods. The water jet 12 is interrupted by a pivotal blocking bar 22 within a blocker housing. The blocking bar 22 is pivoted in a collar 24*b* to a first desired position out of the path of water jet 12 or to a second desired position for blocking the path of water jet 12. A pivot arm 28, controlled by an output shaft 30 of a rotary actuator 32, controls the rotation of the blocking bar 22. A high pressured airflow is introduced into the device for controlling the exhaustion of blocked water within the device and for cooling the rotary actuator 32.

18 Claims, 3 Drawing Sheets

HIGH-SPEED WATER JET BLOCKER

CROSS REFERENCE TO RELATED APPLICATION

The present application is a continuation-in-part from U.S. patent application Ser. No. 08/618,319, Mar. 19, 1996.

FIELD OF THE INVENTION

This invention relates generally to a product cutter utilizing a high pressure fluid jet, and more particularly, to methods and apparatus for selectively interrupting the flow of a stream of high pressure water used to cut products.

BACKGROUND OF THE INVENTION

Fluid jets have been used to cut food, paper and other products for years. The advantages are numerous: there are no blades that need to be sharpened or replaced, no dust is created, and cuts can be quick and clean. The cutting is done with a thin, high pressure, high velocity stream of water or other fluid. Pressurized water is ejected from a very small orifice to create the jet. When the jet touches the product, a thin slice is removed without any appreciable water being absorbed into the product.

Specific manipulation of the flow of fluid emanating from the water jet accurately cuts shapes in the products. Many of the shapes desired require precise high speed interruption of the water jet. The greater the detail of the desired shape of the product, the faster the interruption of the jet must be in order to attain such detail. Also, a higher rate of interruption results in less processing time.

Various ways have been taught to interrupt the water jet at high speeds. One such method of interruption is that of inserting an object between the source of the high speed water jet and the product. A linear actuator pressurized by air that forces a plunger pin into the path of the water jet is a generally known tool for performing this method. A spring provides a retracting force for the plunger pin. Existing plunger pin devices are capable of reaching closure times of 50–90 ms and thereby limit the speed at which products may be cut by the water jet.

U.S. Pat. No. 4,693,153 (Wainwright et al.) discloses another water jet interruption technique. When interruption of the object cutting jet is desired, a second high pressure fluid is directed at the object cutting jet so as to disperse the latter and impair its object cutting properties. The device that controls the second fluid flow is similar to the plunger pin device. A solenoid device within the jet obstructer device controls the fluid flow from the jet obstructer device. An energized solenoid closes a plunger mechanism that is normally held in an open position by a spring. In the open position the mechanism provides high pressure fluid to interrupt the object cutting water jet. Similar to the plunger pin device, this device also lacks the high speed interruption capabilities necessary for cutting products as rapidly as may be desired.

International application number WO93/10950 discloses a valve for controlling a constantly running liquid cutting jet. A pneumatically powered rotary cylinder 2 is attached to one end of and elongate plate 1 to rotate the opposite end of the plate in and out of the path of flow of the liquid cutting jet. However, the opening and closing times for this rotary plate are only slightly better than that of existing plunger pin devices. Also, the cutting jet strikes one position on the plate resulting in frequent replacement of the plate.

The prior art described above fails to address the issue of efficient removal of deflected cutting fluid for avoiding absorption into the product. Also the issue of high temperature caused by high speed operation is not addressed. Consistent high temperatures will cause premature failure of the valve device.

The devices currently in use, as exemplified by those described above, do not effectively and efficiently solve the problem of cutting precise shapes at high speeds that require a high frequency of water jet interruption. Accordingly, the present invention was developed, and provides significant advantages over previous devices or methods to cut shapes with fluid jets.

SUMMARY OF THE INVENTION

In accordance with this invention, a method and apparatus for controlling the flow of a stream of high pressure fluid used for cutting an object is disclosed. The apparatus includes a main housing with a blocking device and a rotary actuator disposed within. The rotary actuator generates a rotary output torque. The apparatus also includes a coupling mechanism that provides a couple between the blocking device and the rotary actuator to transmit the rotary output torque from the rotary actuator to the blocking device to cause the blocking device to shift into the path of travel of the stream of high pressure fluid to disrupt the flow of the high pressure stream and out of the path of the high pressure fluid to not disrupt the flow of the high pressure stream.

In accordance with further aspects of this invention, the blocking device is a rod and the coupling mechanism couples one end portion of the rod to the rotary actuator.

In accordance with still further aspects of this invention, a support pivot supports the rod, wherein the support for the rod is disposed with the housing between the path of travel of the stream of high pressure fluid and the rod's connection to the coupling mechanism.

In accordance with yet other aspects of this invention, the rod is adjustable orthogonally to the flow of the high pressure stream. Also, the rod is removable from the housing and rotatable within the housing.

In accordance with other aspects of this invention, the rotary actuator toggles to predefined limits that are controlled by a controlling mechanism.

In accordance with other aspects of this invention, high pressure air is directed past the rotary actuator for cooling the rotary actuator. The directed high pressure air is further directed to expel fluid from the housing remaining from the disrupted flow of the high pressure stream.

As will be readily appreciated from the foregoing summary, the invention provides a new and improved method and apparatus for controlling the flow of a stream of high pressure fluid used for cutting. Because the method and apparatus does not require the use of a plunger pin device, the disadvantages associated with the use of connectors, briefly described above, are avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
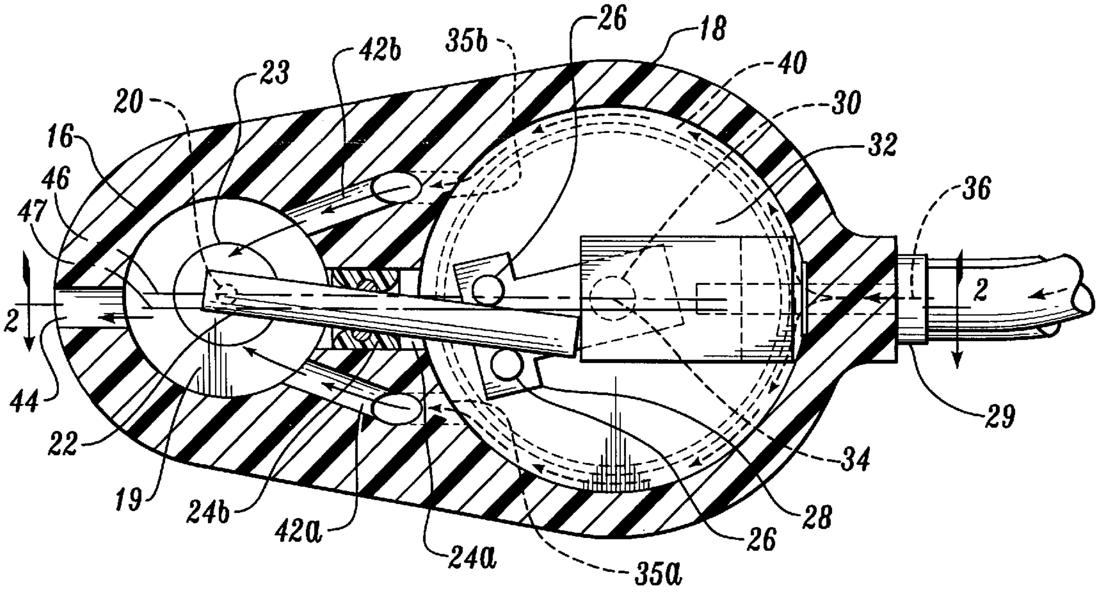
FIG. 1A and 1B are horizontal cross-sectional views of a preferred embodiment of the present invention.
Figure 1B:
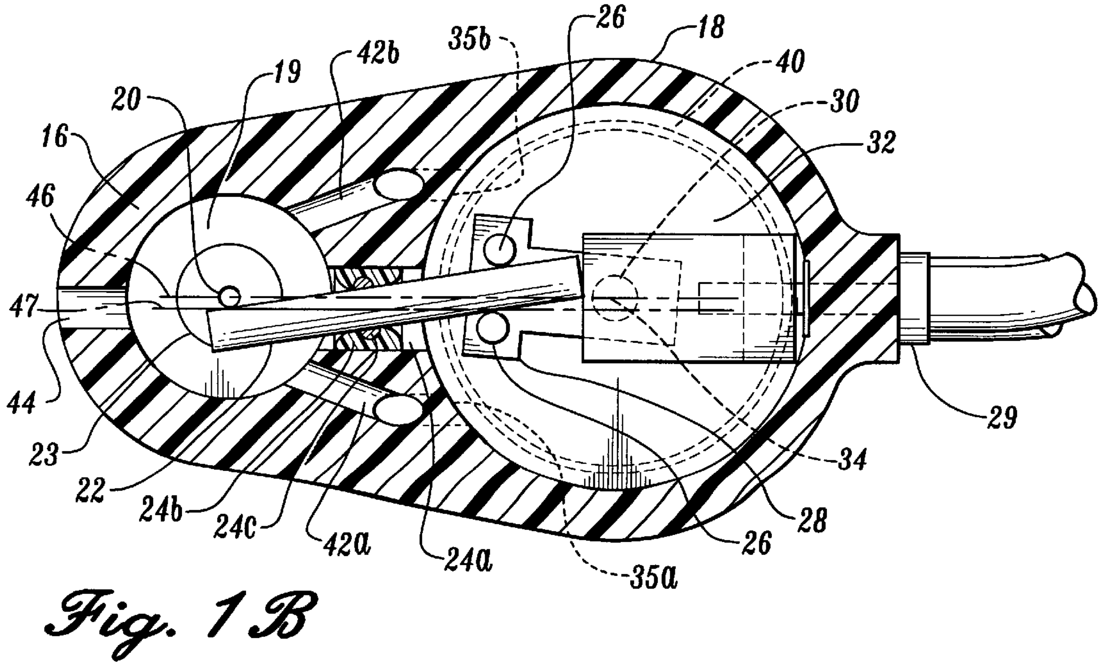
Figure 2:
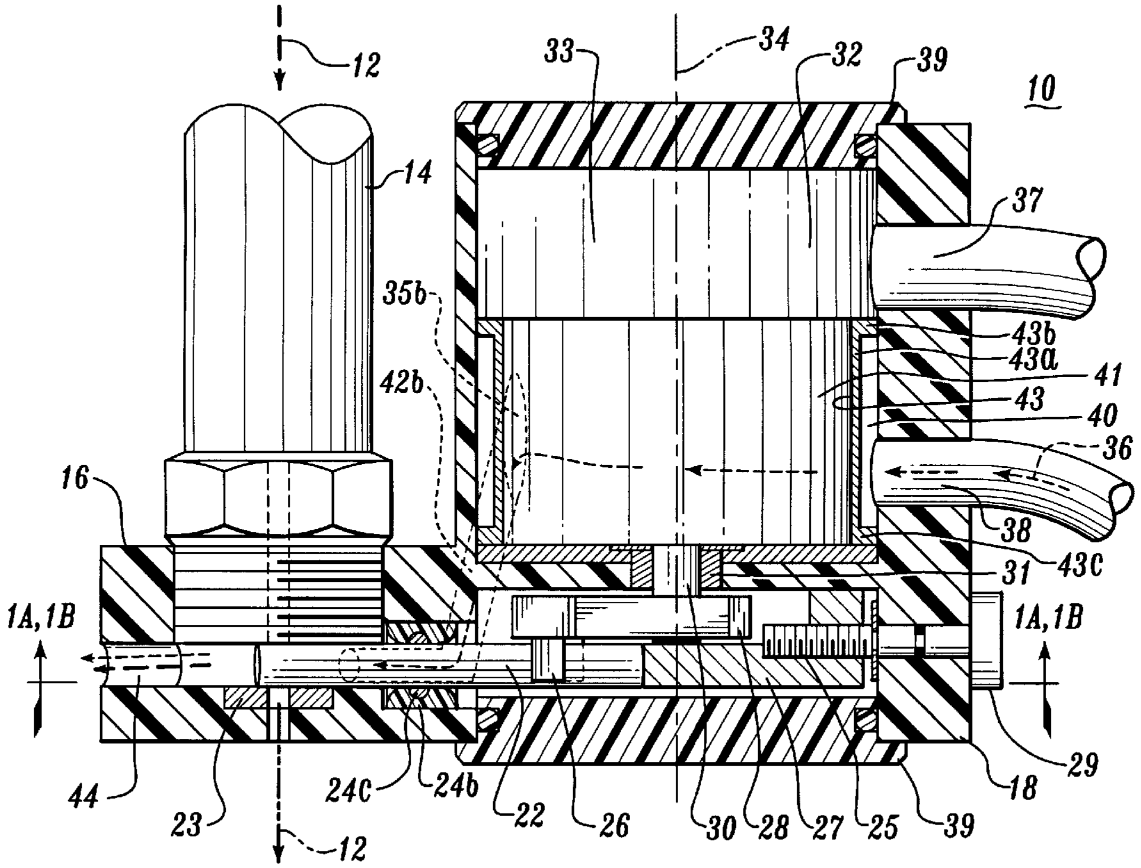
FIG. 2 is a vertical cross-sectional view of FIG. 1A taken substantially along lines 2—2 thereof.

A first preferred embodiment of the present invention is illustrated in FIG. 2. The high speed water jet blocker 10 includes a main housing 18, with a projecting portion 16. The main housing 18 and the projecting portion 16 include cavities with a connecting passageway for housing a rotary actuator 32, a blocking bar 22, an output shaft 30, a pivot arm 28, vertical pins 26 and a collar 24*b*. The main housing 18 and projecting portion 16 are preferably composed of a high density plastic, such as Delrin®. For the purposes of this detailed description, the high speed water jet blocker 10 shown in FIG. 2 is in an upright position with a top and bottom where the projecting portion 16 of the water jet blocker 10 is attached to and flush with the base of the main housing 18. Also, the views of FIGS. 1A and 1B are toward the bottom of the water jet blocker 10.

Within projecting portion 16 is a downwardly extending counterbore cavity 19 that opens at the top of the projecting portion 16. The open upper end of the counterbore cavity 19 receives a nozzle 14 attached to the discharge end of a high pressure water line (not shown). The nozzle 14 supplies (discharges) a very fine, high pressure, high speed fluid or water jet 12 in a vertically descending direction into counterbore cavity 19. A small opening 20 at the base of counterbore cavity 19 provides an opening for the high speed water jet 12 to exit projecting portion 16 for the purpose of cutting products located below the blocker 10. Small opening 20 is large enough to avoid interfering with the flow of water jet 12. Also, a disk-shaped carbide insert 23 surrounds small opening 20, protecting it from wear due to high pressure deflected fluid.

Also located within counterbore cavity 19 of projection portion 16 is the distal end of a pivotal blocking bar 22. The pivotal blocking bar 22 has two operational positions within the counterbore cavity 19. As shown in FIG. 1A, the first operational position is a water jet blocking or interrupting position. Blocking bar 22 provides interruption of the flow of the water jet 12 because of its location over small opening 20. As shown in FIG. 1B, the other operational position is a cutting position since blocking bar 22 is dislocated laterally from small opening 20 thereby providing an uninterrupted flow of water jet 12.

As shown in FIG. 1A, a lateral passageway 24*a* creates a path from the counterbore cavity 19 to a lower cavity 25 within main housing 18. Lower cavity 25 creates an opening at the base of main housing 18 and extends vertically to a level higher than passageway 24*a*, but lower than the top of projecting portion 16, as shown in FIG. 2. Blocking bar 22 is disposed within passageway 24*a* and supported by a collar 24*b* to extend into lower cavity 25. Collar 24*b* is preferably composed of stainless steel and press fit within the passageway 24*a*. An O-ring seal 24*c* is used to prevent water from entering lower cavity 25. The O-ring seal is seated within a groove formed in the internal diameter of the collar 24*b*. The internal ends of the collar 24*b* are beveled allowing the bar to pivot freely side-to-side, as discussed more fully below, without interference with the collar.

The proximal end of blocking bar 22 that extends into the lower cavity 25 extends between a pair of spaced apart pins 26 extending transversely downwardly from the distal end of a pivot arm 28. The proximal end of pivot arm 28 is securedly connected to an output shaft 30. As shown in FIG. 2, output shaft 30 extends through a vertical opening 31 at the top of lower cavity 25 from a rotary actuator 32 contained in an upper cavity 33 formed within main housing 18. The upper cavity has a base that is approximately at the same vertical elevation as the top of projecting portion 16. The upper and lower cavities are approximately equal in diameter and both have a larger diameter than the diameter of counterbore cavity 19. Also, upper cavity 33 is open at the top of main housing 18. Both cavity openings are closed by corresponding cavity caps 39.

As shown in FIG. 1A, the output shaft 30, pivoted by the rotary actuator 32, is at a maximum counter-clockwise position. When the output shaft 30 of rotary actuator 32 is in such maximum counter-clockwise position, pivot arm 28 is also at a maximum counter-clockwise position, thereby pivoting the blocking bar 22 in a clockwise direction about collar 24*b* to block the flow of water jet 12. As shown in FIG. 1B, rotary actuator 32 rotates the output shaft 30 and pivot arm 28 to a fully clockwise position. Correspondingly, the blocking bar 22 is pivoted in a counter-clockwise direction about collar 24*b*, thereby retracting the blocking bar 22 out of the path of the water jet 12 to allow the water jet to flow through the water jet blocker 10. The total range of rotation of the output shaft 30 and pivot arm 28 is approximately forty-five degrees with somewhat equal rotation relative to a longitudinal centerline 46 extending between the centers of small opening 20 and output shaft 30. As shown in FIGS. 1A and 1B, the longitudinal centerline 47 of passageway 24*a* is offset slightly from longitudinal centerline 46. Passageway 24*a* is offset so blocking bar 22 covers small opening 20 when the output shaft 30 and pivot arm 28 are in the fully counter-clockwise position and so blocking bar 22 does not block small opening 20 when the output shaft 30 and pivot arm 28 are in the fully clockwise position.

An exhaust port 44 provides a lateral opening from counterbore cavity 19 at a position on the counterbore cavity 19 diametrically opposed from passageway 24*a*. The base of exhaust port 44 is shown at the same elevation as blocking bar 22. Exhaust port 44 provides a route for fluid to escape counterbore cavity 19 during water jet interruption.

A further aspect of the present invention is illustrated in FIGS. 1A, 1B and 2. An annular cavity 40 is defined by the internal diameter of the upper cavity 33 and a metallic sleeve 43. Ideally the sleeve 43 is composed of aluminum or similar metal. Sleeve 43 includes a cylindrical body portion 43*a* and upper and lower flanges 43*b* and 43*c* that extend radially outwardly from the upper and lower ends of the sleeve. The sleeve body portion 43*a* snugly surrounds the lower portion 41 of the actuator, and the outer circumferences of the flanges 43*b* and 43*c* snugly engage against the inner surface of the main housing 18 that defines the outer diameter of the annular cavity 40. It will be appreciated that the upper, lower and inner walls of annular cavity 40 are formed by the flanges 43*b* and 43*c* and body portion 43*a*, respectively, of the sleeve 43. Also, sleeve 43 occupies the space in upper cavity 33 below an upper portion of rotary actuator 32 not occupied by the lower portion 41 of rotary actuator 32 and annular cavity 40.

An inlet port 38 leads into the annular cavity 40, and a pair of outlet ports 35*a* and 35*b* leads away from annular cavity 40. The input port 38 is located at the lower portion of the annular cavity 40 along longitudinal centerline 46. Input port 38 is connectable to a pressurized air source. Also, input port 38 is located on the main housing 18 distally opposed from projecting portion 16.

Exhaust ports 35*a* and 35*b* are located approximately equidistant from longitudinal centerline 46. The exhaust ports connect to air passageways 42*a* and 42*b* leading between annular cavity 40 and counterbore cavity 19. Air passageways 42*a* and 42*b* extend down main housing 18 angled slightly towards projecting portion 16. Within projecting portion 16, air passageways 42*a* and 42*b* extend horizontally at an elevation approximately equal to the elevation of passageway 24*a*. The horizontal sections of the air passageways 42*a* and 42*b* angle toward the center of counterbore cavity 19 to deliver, through openings in counterbore cavity 19, high pressure air on either side of blocking bar 22. When an air source is attached, pressurized air follows air path 36 and enters inlet port 38, travels through annular cavity 40, exits through exhaust ports 35*a* and 35*b*, travels through passageways 42*a* and 42*b*, and enters counterbore cavity 19 to blow excess or deflected fluid out of counterbore cavity 19 through exhaust port 44. Pressurized air continuously flows thus providing a cooling effect on sleeve 43 which conducts heat away from rotary actuator 32.

As noted above, sleeve 43 in addition to defining portions of annular cavity 40, also serves to seal the lower portion 41 of the rotary actuator 32 from moisture. Such moisture may be latent within the air supplied to the jet blocker 10 through input port 38. Also, the moisture may originate from the water jet 12 and may "back up" into the cavity 40 through the air passageways 42*a* and 42*b* and exhaust ports 35*a* and 35*b*.

Figure 3:
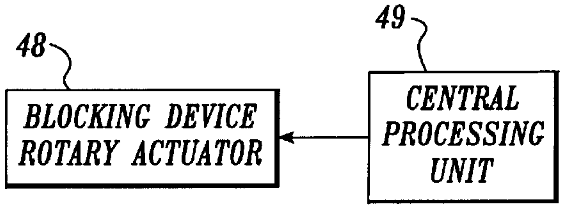
FIG. 3 is a block diagram of the present invention.

Rotary actuator 32 is a device that converts electric energy into a controlled rotary force that is quickly reversible in the rotary direction. The rotary actuator can pivot the pivot arm 28 into the path of the water jet 12 and reverse direction to retract the pivot arm out of the path of the water jet in as little as 5–6 milliseconds. Electrical energy is provided to a rotary actuator 32 from a power supply through power cord port 37 located above input port 38, as shown in FIG. 2. The water jet blocker 10 is controlled by and used in various systems. As shown in FIG. 3, the present invention uses some form of processing unit or computer 49 to supply the rotary actuator 32 with a controlled electrical energy supply. Processing unit 49, with predefined routines, controls an electrical signal sent to rotary actuator 32, thereby controlling the cutting pattern of water jet blocker 10. Multiple water jet blockers can be used in conjunction with a computer controller for performing simultaneous high speed interactive cuts.

Some systems that incorporate the blocking device of the present invention are designed to operate continuously or with very little down time thereby requiring a cutting device with effective and efficient maintenance. Due to the destructive force of high speed water jet 12, blocking bar 22 is eventually eroded away, thereby reducing the efficient feature of the system. One solution is a bar adjustment mechanism 27 and 29 within the water jet blocker 10. A knurled lead screw 29 controls the longitudinal position of an adjusting backstop 27. As shown in FIGS. 1A, 1B and 2, screw 29 is sealed with respect to housing 18 by an O-ring in a through hole located below input port 38 at approximately the elevation center of lower cavity 25. Also, the thread, leading portion of screw 29 extends into lower cavity 25 to a position free from interfering with pivot arm 28.

Backstop 27 is positioned within lower cavity 25. The backstop includes a rear portion that includes an upwardly extending abutment wall having a threaded opening formed therein to receive the complementarily threaded lead portion of screw 29. The backstop also includes a front or leading end that abuts against the proximal (rear) end of blocking bar 22. Rotation of screw 29 adjusts the longitudinal (forward and rearward) position of backstop 27, thereby correspondingly adjusting the longitudinal position of blocking bar 22. Adjustment of the longitudinal position of the bar within the blocker 10, provides multiple water jet contact locations along the length of the bar, effectively delaying failure of the bar.

Another solution is a quick and efficient bar rotation or removal. Under normal operating conditions, blocking bar 22 maintains its longitudinal as well as its rotational position relative to water jet 12. This lack of "walking" movement of the bar causes water jet 12 to consistently strike blocking bar 22 at the same spot on the bar. As can be appreciated, eventually the water jet 12 erodes away enough of the bar 22 to cause the bar to sever or otherwise fail. Quick and convenient rotation of the bar provides extended bar life, thereby improving the maintainability of the bar.

Bar composition is also important in reducing maintenance time. The bar could be composed of titanium, carbide or a memory alloy such as a nickel-titanium, all of which are highly resistant to erosion by the high pressure water jet. The bar alternatively could be composed of a carbide core covered with a stainless steel or other alloy cover sized to impose a high compressive load on the core. Applicants have found that although the stainless steel cover may erode rather quickly, the loaded carbide core is highly resistant to erosion, much more so than if the stainless steel cover were not used. Alternatively, a very hard substance, such as a natural or synthetic diamond, could be inlayed into the blocking bar to serve as a wear surface.

Figure 4:
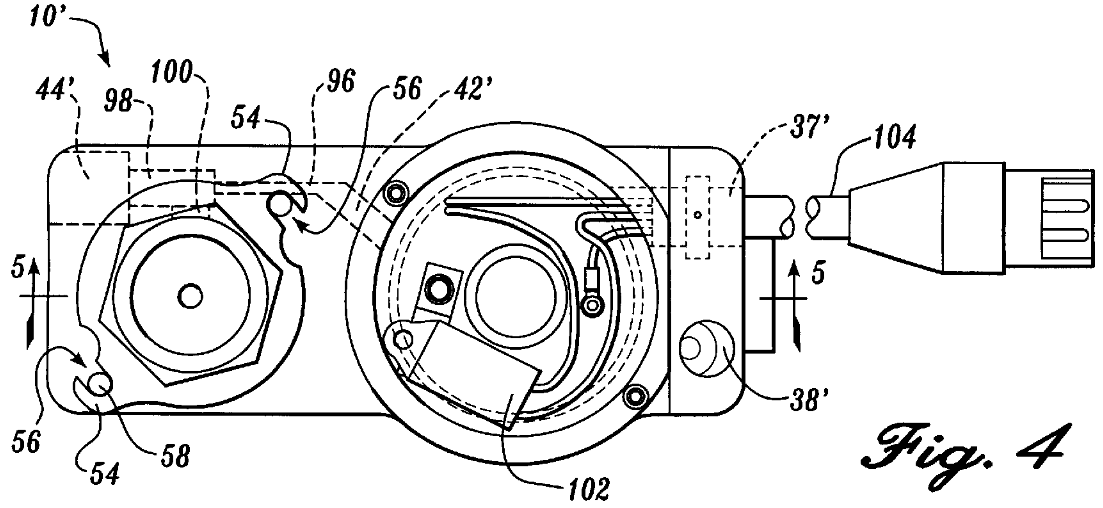
FIG. 4 is a plan view of a further preferred embodiment of the present invention.
Figure 5:
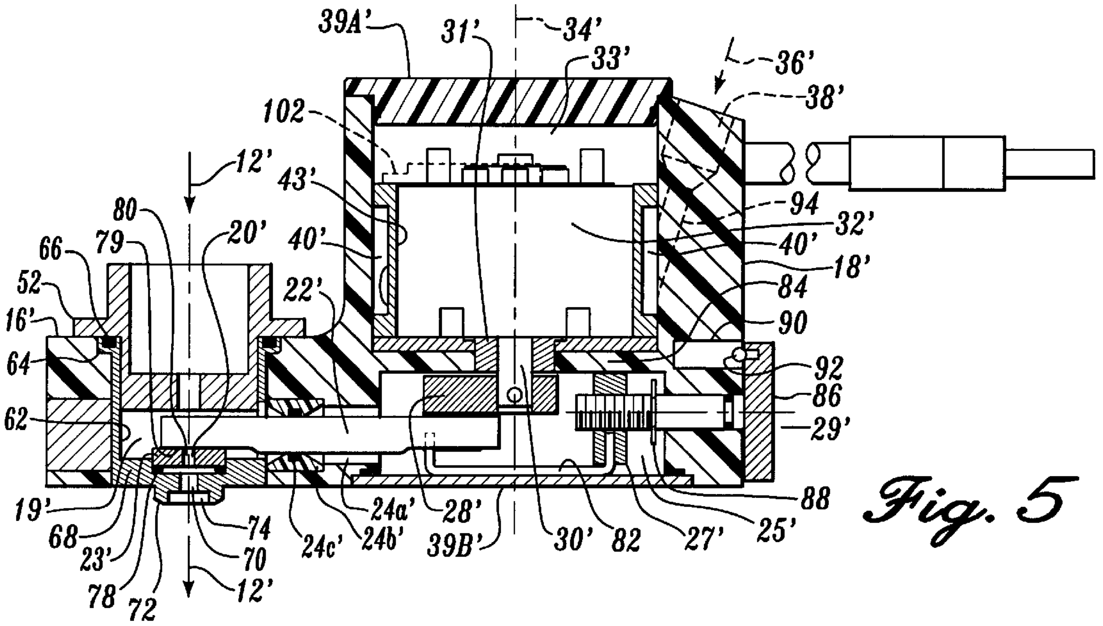
FIG. 5 is a cross-sectional view of FIG. 4 taken substantially along lines 5—5 thereof.
Figure 6:
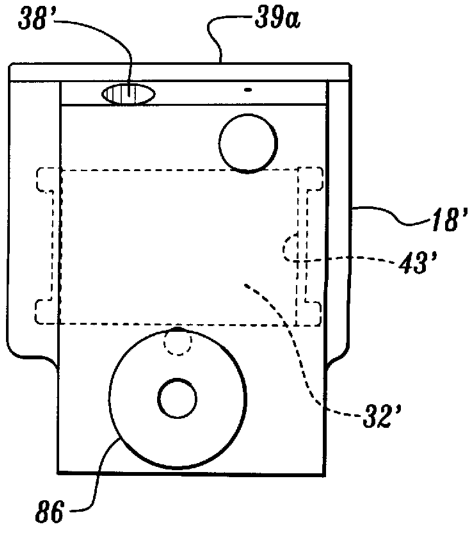
FIG. 6 is an end view of the embodiment of the present invention shown in FIGS. 4 and 5.

FIGS. 4–6 illustrate a further embodiment of the present invention in the form of water jet blocker 10'. The components of the present invention shown in FIGS. 4–6 that correspond to those components shown in FIGS. 1A, 1B, and 2 are identified with the same part number but with the addition of prime (') designations. Also, the following description focuses on the differences between the embodiment shown in FIGS. 4–6 from that shown in FIGS. 1A, 1B, and 2, and thus not all aspects of the present invention shown in FIGS. 4–6 will be described in the same detail as described above with respect to FIGS. 1A, 1B, and 2.

Referring initially to FIGS. 4 and 5, a flange connector 52 is used to attach a high pressure nozzle, not shown, to housing portion 16'. The connector 52 has a pair of diametrically opposed wing portions 54 having slots 56 formed therein for engaging screws 58 extending downwardly into the housing portion 16'. The heads of the screws bear against the upper surface of wing portions 54 to thereby securely hold the flange connector 52 locked in place. Of course, other methods could be used to attach the nozzle to the housing.

A cup 62 snugly engages within a vertical bore formed through housing portion 16'. The cup 62 defines an interior cavity 19' through which the high speed water jet 12' enters and exits when not blocked. The cup 62 includes a cylindrical portion that extends vertically through the projecting portion 16'. The cup also includes an upper annular flange 64 having an upwardly open groove formed therein for receiving an O-ring 66 to form a water tight seal between the under side of the flange portion of connector 52 and cup 62. The cup 62 also includes a bottom floor 68 formed with a small diameter central opening 20 in alignment with the central vertical axis of the flange connector 52, which is in alignment with the center of the path of the water jet 12' entering the apparatus of the present invention. An annular ring 72 extends downwardly from the under side of cup floor 68, with a counter bore 74 being formed therein of a size larger than the diameter of the central opening 70. Ring 72 serves as a drip guard to prevent moisture on the exterior of housing portion 16' from dripping into the path of travel of water jet 12' thereby interfering with or disrupting the flow of the water jet.

A circular support and wear plate 76 fits within a shallow counter bore formed in the upper side of cup floor 68. An O-ring 78 is positioned within the counter bore to provide a seal with the under side of the wear plate 76, and also compensates for minor misalignments between the upper surface of the wear plate and the lower, flat surface 79 of the blocking bar 22' thereby to provide a substantially full face-to-face mating between the wear plate and the blocker bar lower surface. A small diameter central opening 80 is formed in the wear plate 23' through which the water jet 12' passes when in unblocked condition. Ideally cup 62 is composed of a hardware resistant non-corroding material, such as stainless steel.

As with blocking bar 22 described above, blocking bar 22' is supported for pivotal or toggle movement at a location intermediate its ends by a collar **24*b*' positioned within lateral passageway 24*a*'. The collar 24*b*' is generally triangularly shaped in cross-section, as shown in FIG. 5. Ideally, the collar 24*b*' is composed of a hard wear-resistant material, such as stainless steel. An O-ring seal 24*c*' is disposed within a groove extending around the inside diameter of the collar 24*b*' to seal against the outer diameter of the blocking bar 22'. However, it will be appreciated that the shape of the collar 24*b*' allows the blocking bar 22' to pivot freely side-to-side, and the O-ring seal 24*c***' allows the blocking bar to shift lengthwise, as discussed below.

The distal end portion of the blocking bar 22' engages through an opening formed in the side wall of cup 62, thereby to extend into the interior of the cup. Although the portion of the blocking bar 22' engaged through a collar **24*b*' is formed with a circular exterior diameter, the distal end portion of the blocking bar 24' is formed with a flattened lower surface to slidably mate with the flat upper surface of the wear plate 23**', as discussed above.

The proximal end portion of the blocking bar 22' is disposed within a lower cavity 25' formed in the lower portion of housing 18'. The proximal end of the blocking bar 22' is pivoted or toggled side-to-side by a pivot arm 28' pinned to the lower end of the output shaft 30' of rotary actuator 32'. The pivot arm 28' is formed with a pair of integral, downward extending, spaced apart lugs (corresponding to pins 26 shown in FIGS. 1 and 2) for receiving the proximal end of the blocking bar 22' therebetween. As in the blocking bar 22 discussed above, blocking bar 22' is pivoted side-to-side about collar **24*b*' as the pivot arm 28' rotates back and forth about axis 34', corresponding to the longitudinal center of output shaft 30'. Ideally, the under side of the proximal end of the blocking bar 22' is also formed with the flat face corresponding to the distal end of the blocking bar 22'. This allows the blocking bar 22' to be removed and then repositioned end-to-end so that both end portions of the blocking bar can serve to block the water jet 12'. As discussed above, over time, the surface of the blocking bar impacted by the water jet 12**' is eroded away due to the extremely high pressure of the water jet.

Referring primarily to FIG. 5, the longitudinal position of the blocking bar may be adjusted, thereby to present a different portion of the blocking bar to the high speed water jet 12' as the blocking bar is eroded under the action of the water jet. To this end, one end of the generally U-shaped, wire form connecting arm 82 extends through a close fitting hole extending transversely upwardly from the under side of the proximal end of the locking bar. Ideally, a corresponding hole is formed in the opposite (distal) end of the blocking bar for use when the blocking bar is repositioned end-to-end, as described above. The longitudinal portion of the arm 82 rests against the upper surface of a bottom cap **39*b*' which closes off lower cavity 25**'.

The second transverse end portion of the arm 82 extends upwardly into an adjusting block 27' disposed within lower cavity 25'. Ideally, the upper surface of the adjusting block 27' is disposed closely adjacent the bottom surface of the horizontal partition 84 that separates the lower cavity 25' from the housing upper cavity 33'. The adjusting bar 27' is formed with a threaded through hole for engaging the threaded portion of lead screw 29'. The lead screw 29' includes an enlarged circular knob 86 positioned outwardly of housing 18' for convenient manual rotation. The outer circumference of the knob 86 may be knurled to help grip the knob, especially when wet. A retaining clip 88 is locked onto the shaft of the lead screw at the base of the threads thereof to maintain the lead screw engaged through a close fitting horizontal bore hole formed in the housing 18'. A spring-loaded ball detent assembly 90 is snugly engaged within a blind bore formed in the wall of housing 18 at a location corresponding to the outer perimeter portion of lead screw knob 86. The detent assembly 90 includes a spring-loaded ball 92 which presses against the under side of the lead screw knob. Ideally, an indentation is formed in the lead screw knob to serve as a seat for the detent ball 92. To present a new wear surface to the water jet 12', the lead screw 29' is periodically rotated one revolution whereupon the lead screw seats with the detent ball 92, which retains the lead screw from rotating other than when desired.

It will be appreciated that the connecting arm 82 conveniently advances and retracts the blocking bar 22' as the adjusting block 27' is advanced and retracted along the length of the lead screw 29', while at the same time permitting the proximal end portion of the blocking bar to pivot side-to-side under the control of pivot arm 28'. To this end, the portion of the connecting arm 82 adjacent the proximal end of the blocking bar simply moves side-to-side with the movement of the blocking bar.

It will be appreciated that the blocking bar 22' may be conveniently turned end-to-end by removing cap **39*b*' and then disengaging the connecting arm 82 from the blocking bar and the adjusting block 27', whereupon the blocking bar may be slidably removed from collar 24*b***'. After being rotated end-to-end, the blocking bar may be reinserted by reversing the above procedure.

Another manner in which the embodiment of the present invention shown in FIGS. 4–6 differs with the embodiment shown in FIGS. 1A, 1B, and 2 is the manner in which the deflected or blocked fluid from the water jet 12' is removed from the cavity 19', especially when the blocking bar 22' blocks the travel of the water jet. To this end, an air inlet port 38' is formed in the sloped upper ledge of the housing 18' located above and laterally to one side of lead screw 29'. A reduced diameter inlet passage 94 interconnects the inlet port 38' with an annular cavity 40' defined by the internal diameter of upper cavity 33' and the exterior of a heat conductive sleeve 43'. Such sleeve 43' is formed with upper and lower annular flanges, the outer perimeter of which snugly engages with the inside diameter of the upper cavity 33'. The gap between the upper and lower annular flanges and between the inside diameter of upper cavity 33' and the outer diameter of sleeve 43' defines the annular cavity 40'.

As shown in FIG. 4, at a location approximately diametrically opposite of the location of inlet port 38' and inlet passageway 94, an air outlet passageway 42' extends through housing 18' in a direction diametrically outwardly and downwardly from the cavity 40' to an elevation corresponding to the elevation of cavity 19' formed in housing portion 16'. The end of air outlet passageway 42' opposite annular cavity 40' intersects with a small diameter horizontal air passageway 96 which in turn exits into a larger diameter horizontal bore portion 98 that functions as a reduced pressure venturi chamber. As a result, the air flowing therethrough acts as a substantially free jet, unencumbered by the interior cylindrically shaped wall of the venturi chamber 98. As a result, the air flowing through the venturi chamber 98 tends to draw the fluid in cavity 19' through transverse passageway 100 and then out through exhaust port 44'. Thus, unlike the embodiment shown in FIGS. 1A, 1B, and 2, the embodiment of FIGS. 4–6 does not attempt to drive the overspray and blocked fluid out of counter bore cavity 19' under pressurized air, but rather effectively draws such overspray and blocked fluid out of the counter bore cavity under a reduced pressure of venturi action. Applicants have found that, as a result, the blocked water jet more quickly resumes a normal flow when unblocked, i.e., when the blocking bar 22' is removed from the path of travel of the water jet. During the unblocking of the water jet, as finite a length of time is required for the water jet to reconstitute itself and exit housing portion 16 as the same high pressure stream entering the housing portion. This time requirement for reconstitution is shorter in the embodiment of the present invention shown in FIGS. 4–6.

It will be appreciated that the air entering housing portion 18' and exiting housing portion 16' also functions to cool the actuator 32' in the same manner as described above with respect to FIGS. 1A, 1B, and 2. In addition, as shown in FIG. 4, a thermostat 102 is interposed between the electrical supply line 104 and the rotary actuator 32' to prevent electricity from reaching the rotary actuator if an overheated condition occurs.

While preferred embodiments of the invention has been illustrated and described, it will be appreciated that various changes can be made therein without departing from the spirit and scope of the invention.

The embodiments of the invention in which an exclusive property or privilege is claimed are defined as follows:

1. An apparatus for controlling the flow of a stream of high pressure fluid used for cutting, the apparatus comprising:

(a) a housing;

(b) a blocking member supported within the housing;

(c) a rotary actuator disposed within the housing and capable of generating a rotary output torque;

(d) coupling means to couple the blocking member and the rotary actuator to transmit the rotary output torque from the rotary actuator to the blocking member to cause the blocking member to pivot about an axis into the path of travel of the stream of the high pressure fluid to disrupt the flow of the high pressure stream and out of the path of the stream of the high pressure fluid to not disrupt the flow of the high pressure stream; and (e) means for collecting the disrupted flow of high pressure fluid and directing the disrupted flow of high pressure fluid to a remote location.

2. The apparatus of claim 1, wherein the blocking member comprises a rod, and the coupling means couples one end portion of the rod to the rotary actuator.

3. The apparatus of claim 2, further comprising support means for supporting the rod at a location between the location that the coupling means couples the rod and the location that the rod disrupts the flow of the high pressure stream, to enable the rod to pivot about an axis extending transversely to the length of the rod.

4. The apparatus of claim 1, further comprising support means for pivotally supporting the blocking member, wherein the support means is disposed within the housing between the path of travel of the high pressure fluid and the location of the coupling means.

5. The apparatus of claim 4:

wherein when the blocking member is within the path of travel of the stream of high pressure fluid, the stream impacts the blocking member at a location spaced from the support means; and further comprising means for supporting the blocking member against impact forces imposed thereon by the stream of high pressure fluid.

6. The apparatus of claim 1:

wherein when the blocking member is within the path of travel of the stream of high pressure fluid, the stream impacts against the blocking member; and further comprising means for adjusting the position of the blocking member relative to the high pressure stream to change the location that the high pressure stream impacts against the blocking member.

7. The apparatus of claim 1, wherein;

the rotary actuator rotatably toggles between predefined first and second limits; and, when the rotary actuator is toggled to one of the first and second limits the blocking member is within the path of travel of the stream of high pressure fluid to disrupt the flow of the high pressure stream, and when the rotary actuator is toggled to the other of the first and second limits, the blocking member is out of the path of the stream of the high pressure fluid to not disrupt the flow of the high pressure stream.

8. The apparatus of claim 7, further comprising control means for controlling the toggling of the rotary actuator.

9. The apparatus of claim 1, wherein the housing includes an air inlet, an air outlet and a passageway extending between the air inlet and air outlet, the passageway communicating with the location at which the blocking member blocks the path of travel of the stream of high pressure fluid, the air flowing through the passageway capable of directing the high pressure fluid disrupted by the blocking member away from the blocking member and into the passageway and out the air outlet.

10. The apparatus of claim 9, wherein the passageway also includes portions defined by a heat conducting sleeve disposed around the exterior of the rotary actuator, the air flowing over portions of the heat conducting sleeve for cooling the heat conducting sleeve, thereby cooling the rotary actuator.

11. An apparatus for controlling the flow of a stream of high pressure liquid used for cutting, the apparatus comprising:

(a) a housing positionable relative to the path of the stream of high pressure liquid;

(b) a rotary actuator disposed within the housing and capable of generating a rotary output torque;

(c) a blocking member;

(d) support means for pivotally supporting the blocking member to pivot about an axis; and (e) a coupler assembly having portions coupling the blocking member to the rotary actuator to transmit the rotary output torque from the rotary actuator to the blocking member to pivot the blocking member about the support means between a first position within the path of travel of the stream of high pressure liquid to disrupt the flow of the high pressure liquid stream and a second position out of the path of the high pressure liquid stream to not disrupt the flow of the high pressure liquid stream.

12. The apparatus according to claim 11, wherein the support means for the blocking member permits adjustment of the location of the blocking member within the housing to change the portion of blocking member that disrupts the flow of the high pressure liquid stream when the blocking member is in its first position.

13. The apparatus according to claim 11, wherein the housing further comprises an air inlet and an air passageway in communication with the air inlet for receiving air from a remote air source, the air passageway being in airflow communication with the location at which the flow of the high pressure liquid stream is disrupted by the blocking member thereby to direct the disrupted flow of high pressure liquid away from such location.

14. The apparatus according to claim 13, wherein the air passageway at least partially surrounds a heat conducting sleeve disposed around the exterior of the rotary actuator to direct air over the heat conducting sleeve for cooling the heat conducting sleeve, thereby cooling the rotary actuator.

15. The apparatus according to claim 11, wherein the support means supports the blocking member to pivot about an axis spaced from the location at which the coupler assembly couples the blocking member.

16. The apparatus according to claim 15, wherein the blocking member comprises an elongated rod, and the support means supports the elongated rod to pivot about an axis located intermediate its ends.

17. An apparatus for controlling the flow of a stream of high pressure fluid comprising:

a housing;

a blocking member supported within the housing;

a rotary actuator disposed within the housing and capable of generating a rotary output torque, the rotary actuator being coupled to the blocking member to transmit the rotary output torque from the rotary actuator to the blocking member to cause the blocking member to pivot about an axis into a path of travel of the stream of high pressure fluid to disrupt the flow of the stream of high pressure fluid and to pivot out of the path of the stream of high pressure fluid to not disrupt the flow of the stream of high pressure fluid; and a passageway provided in the housing adjacent a location at which the flow of the stream of high pressure fluid is disrupted by the blocking member and extending distally to a remote location to allow the disrupted flow of high pressure fluid to flow to the remote location.

18. An apparatus for controlling the flow of a high pressure fluid stream comprising:

a housing having an opening through which a high pressure fluid stream passes;

a rotary actuator disposed within the housing and capable of generating a rotary output torque;

a blocking device coupled to the rotary actuator, the blocking device rotating from a first position to a second position in response to the rotary output torque; and wherein when the blocking device is in the first position, the blocking device is in the path of travel of the high pressure fluid stream to substantially prevent the high pressure fluid stream from passing through the opening, and when the blocking device is in the second position, the blocking device is out of the path of travel of the high pressure fluid stream to allow the high pressure fluid stream to pass through the opening.

* * * * *